(12) United States Patent
Klassen et al.

(10) Patent No.: US 11,530,709 B2
(45) Date of Patent: Dec. 20, 2022

(54) METHOD OF OPERATING A FLUID SYSTEM, FLUID SYSTEM AND COMPUTER PROGRAM PRODUCT

(71) Applicant: Festo SE & Co. KG, Esslingen (DE)

(72) Inventors: Daniel Klassen, Esslingen (DE); Gerhard Gommel, Notzingen (DE); David Rager, Nürtingen (DE)

(73) Assignee: Festo SE & Co. KG, Esslingen (DE)

( * ) Notice: Subject to any disclaimer, the term of this patent is extended or adjusted under 35 U.S.C. 154(b) by 363 days.

(21) Appl. No.: 16/910,629

(22) Filed: Jun. 24, 2020

(65) Prior Publication Data

US 2020/0400165 A1   Dec. 24, 2020

(30) Foreign Application Priority Data

Jun. 24, 2019 (DE) .......................... 102019209091.5

(51) Int. Cl.
*F15B 13/04* (2006.01)
*F15B 19/00* (2006.01)
(Continued)

(52) U.S. Cl.
CPC ........ *F15B 13/0401* (2013.01); *F15B 19/002* (2013.01); *F15B 19/005* (2013.01); *F15B 21/08* (2013.01); *F15B 2013/0409* (2013.01); *F15B 2211/329* (2013.01); *F15B 2211/634* (2013.01); *F15B 2211/6309* (2013.01); *F15B 2211/6313* (2013.01); *F15B 2211/6336* (2013.01);
(Continued)

(58) Field of Classification Search
CPC .. F15B 19/002; F15B 19/005; F15B 13/0401; F15B 21/08; F15B 2013/0409; F15B 2211/329; F15B 2211/6309; F15B 2211/6313; F15B 2211/6336; F15B 2211/634; F15B 2211/6656; G05B 13/02; G05B 19/43; G05B 2219/33326; G05B 2219/45006; F25B 2600/25; F25B 2600/2513; G05D 7/0623; G05D 7/0635
USPC ........... 700/282, 283; 251/129.05; 137/487.5
See application file for complete search history.

(56) References Cited

U.S. PATENT DOCUMENTS 3,664,358 A * 5/1972 Kosugi ..................... F15B 9/09
                                                        137/14
4,277,832 A * 7/1981 Wong ................... G05D 7/0635
                                                        137/487
(Continued)

FOREIGN PATENT DOCUMENTS

DE   19514382 A1   10/1996
DE   19927372 C2   12/2000
(Continued)

*Primary Examiner* — William M McCalister
(74) *Attorney, Agent, or Firm* — Hoffmann & Baron, LLP

(57) ABSTRACT

A method for operating a fluid system including the steps: receiving or determining a set value for a stroke of the working valve, determining an actual value for the stroke of the working valve using a sensor signal of a position sensor, determining a deviation value of a working valve in dependence on sensor signals of a supply pressure sensor and a working pressure sensor and a position sensor and a sensor system, and performing a processing of the set value for the stroke of the working valve, the actual value for the stroke of the working valve and the deviation value to a control signal for driving the working valve.

18 Claims, 3 Drawing Sheets

(51) Int. Cl.
*F15B 21/08* (2006.01)
*G05B 19/43* (2006.01)
*G05B 13/02* (2006.01)

(52) U.S. Cl.
CPC ............... *F15B 2211/6656* (2013.01); *F25B 2600/2513* (2013.01); *G05B 13/02* (2013.01); *G05B 19/43* (2013.01); *G05B 2219/33326* (2013.01); *G05B 2219/45006* (2013.01)

(56) References Cited

U.S. PATENT DOCUMENTS

| | | | | |
|---|---|---|---|---|
| 4,791,954 A * | 12/1988 | Hasegawa | ............ | G05D 16/202 |
| | | | | 137/489.5 |
| 5,295,429 A * | 3/1994 | Monk | ............ | F15B 11/00 |
| | | | | 137/635 |
| 5,915,401 A * | 6/1999 | Menard | ............ | G05D 16/202 |
| | | | | 137/12 |
| 5,953,977 A * | 9/1999 | Krishna | ............ | E02F 3/435 |
| | | | | 60/426 |
| 6,112,844 A * | 9/2000 | Bohner | ............ | B62D 5/091 |
| | | | | 180/443 |
| 6,272,401 B1 * | 8/2001 | Boger | ............ | G05B 11/42 |
| | | | | 700/282 |
| 6,466,893 B1 * | 10/2002 | Latwesen | ............ | G05B 23/02 |
| | | | | 702/41 |
| 7,089,086 B2 * | 8/2006 | Schoonover | ............ | G05B 23/0254 |
| | | | | 700/282 |
| 8,301,276 B2 * | 10/2012 | Tautz | ............ | G05B 19/231 |
| | | | | 700/282 |
| 10,794,731 B2 * | 10/2020 | Wu | ............ | G01D 5/2258 |
| 11,001,238 B2 * | 5/2021 | Mastrocola | ............ | B60T 8/1703 |
| 2001/0029985 A1 * | 10/2001 | Jansen | ............ | F15B 13/0402 |
| | | | | 137/625.65 |
| 2002/0134956 A1 * | 9/2002 | Smith | ............ | G05B 19/44 |
| | | | | 700/282 |
| 2003/0098070 A1 * | 5/2003 | Lehnst | ............ | G05D 16/2013 |
| | | | | 137/487.5 |
| 2003/0208305 A1 * | 11/2003 | Junk | ............ | F15B 19/005 |
| | | | | 700/282 |
| 2004/0236472 A1 * | 11/2004 | Junk | ............ | F15B 19/005 |
| | | | | 700/282 |
| 2005/0011190 A1 * | 1/2005 | Bitter | ............ | B66F 9/065 |
| | | | | 60/468 |
| 2005/0182524 A1 * | 8/2005 | Brodeur | ............ | G01F 1/363 |
| | | | | 700/282 |
| 2005/0247350 A1 * | 11/2005 | Coakley | ............ | G01D 5/145 |
| | | | | 137/554 |
| 2007/0191989 A1 * | 8/2007 | Esposito | ............ | G05B 19/0425 |
| | | | | 700/282 |
| 2010/0200083 A1 * | 8/2010 | Kouchi | ............ | G05D 7/0635 |
| | | | | 137/486 |
| 2010/0319664 A1 * | 12/2010 | Kawamura | ............ | F02D 41/0077 |
| | | | | 123/568.24 |
| 2011/0001070 A1 * | 1/2011 | Wilke | ............ | F16K 31/1262 |
| | | | | 251/129.03 |
| 2011/0252895 A1 * | 10/2011 | Kiesbauer | ............ | F16K 37/0091 |
| | | | | 73/862.583 |
| 2012/0104829 A1 * | 5/2012 | Weigel | ............ | F15B 19/005 |
| | | | | 299/1.7 |
| 2012/0136490 A1 * | 5/2012 | Weatherbee | ............ | G01B 7/003 |
| | | | | 700/282 |
| 2013/0103209 A1 * | 4/2013 | Beck | ............ | G05B 11/06 |
| | | | | 700/282 |
| 2015/0057816 A1 * | 2/2015 | Schick | ............ | G05D 7/0635 |
| | | | | 700/282 |
| 2015/0142183 A1 * | 5/2015 | Tautz | ............ | G05D 7/0635 |
| | | | | 700/282 |
| 2015/0159772 A1 * | 6/2015 | Kullen | ............ | F16K 37/0016 |
| | | | | 251/61.5 |
| 2017/0122345 A1 * | 5/2017 | Adams | ............ | F15B 11/10 |
| 2018/0216982 A1 * | 8/2018 | Slot, III | ............ | E21B 33/068 |
| 2019/0024678 A1 * | 1/2019 | Ito | ............ | F15B 11/044 |
| 2019/0064853 A1 * | 2/2019 | Momma | ............ | G05D 7/0617 |
| 2019/0390691 A1 * | 12/2019 | Friman | ............ | G05B 17/02 |
| 2020/0081410 A1 * | 3/2020 | Walker | ............ | G05B 19/406 |
| 2020/0400165 A1 * | 12/2020 | Klassen | ............ | F15B 19/002 |
| 2021/0302053 A1 * | 9/2021 | Hua | ............ | G01F 25/15 |

FOREIGN PATENT DOCUMENTS

| | | |
|---|---|---|
| DE | 10012405 A1 | 9/2001 |
| EP | 2297502 B1 | 3/2011 |

\* cited by examiner

METHOD OF OPERATING A FLUID SYSTEM, FLUID SYSTEM AND COMPUTER PROGRAM PRODUCT

BACKGROUND OF THE INVENTION

The invention relates to a method for operating a fluid system. The invention also relates to a fluid system and to a computer program product.

SUMMARY OF THE INVENTION

The task of the invention is to specify a method for operating a fluid system and a fluid system and a computer program product which take into account time-dependent and/or mode-dependent changes, e.g. deteriorations, of a working valve, which is part of the fluid system, during operation of the fluid system.

This task is solved according to a first aspect of the invention with a method for operating a fluid system, wherein the fluid system comprises a controller and a working valve which can be activated by the controller, which working valve comprises an inlet port to which a fluid source and a supply pressure sensor are connected and which working valve comprises an outlet port to which a fluid consumer and a working pressure sensor are connected, wherein a position sensor for detecting a valve position is assigned to the working valve, wherein a sensor system for detecting a state of movement is assigned to the fluid consumer and wherein the supply pressure sensor, the working pressure sensor and the sensor system are connected to the controller. The following steps are carried out for carrying out the method: receiving or determining a set value for a stroke of the working valve, determining an actual value for the stroke of the working valve by using a sensor signal of the position sensor, determining a deviation value for the working valve as a function of sensor signals of the supply pressure sensor, the working pressure sensor, the position sensor and the sensor system and performing a processing of the set value for the working valve stroke, the actual value for the stroke of the working valve and the deviation value for the working valve to achieve a control signal for controlling the working valve and providing the control signal to the working valve.

The purpose of the method is to take into account a change in the behaviour of the working valve, which can be expressed as a deviation value, for the control of the working valve in order to be able to always ensure a precise control of the working valve, in particular with regard to the opening behaviour of the working valve. A change in the behaviour of the working valve can be a function of time related with a period of use for the working valve on the one hand and on the other hand can be related to operating conditions for the use of the working valve. The change of behaviour results in particular from the properties of at least one seal provided in the working valve, which, together with a valve member movably accommodated in the working valve, is intended to produce a sealing effect between an inlet port and an outlet port of the working valve in a first functional position. Usually, this seal is made of an elastic, in particular a rubber-elastic, material which, due to the length of the period of use, the number of switching cycles for the working valve, the properties of the fluid flowing through the working valve and the ambient conditions under which the working valve is used, can undergo plastic (irreversible) deformation in addition to the elastic (reversible) deformation when the valve member is in a sealing position. This plastic deformation influences an opening position for the working valve, i.e. the position of the valve member at which a fluid flow starts for a given pressure difference between the inlet port and the outlet port. Since the opening position is of high importance for almost the entire operating spectrum of the working valve, correct determination and consideration of the deviation value for the working valve increases a precise operation for the working valve.

The procedure is essentially carried out by the controller, which is designed to provide the control signal to the working valve. The controller may be integrated in a valve terminal and comprises, for example, as essential components a microprocessor and signal processing devices for processing sensor signals. In particular, signals from the supply pressure sensor, the working pressure sensor, the position sensor and the sensor system are regarded as sensor signals. Furthermore, the controller comprises, purely as an example, at least one (electrical or electronic) outlet stage which can outlet a control signal suitable for activating the working valve. As an example, it is provided that the working valve is designed as a solenoid valve or as a fluidically pilot-controlled valve. If the working valve is designed as a solenoid valve, a coil current is provided by the outlet stage of the controller for activating a solenoid coil integrated in the working valve in order to bring influence a position of a valve member which is moveable in a working chamber of the working valve. If the working valve is designed as a fluidically pilot-controlled valve, it can be provided that the controller has two outlet stages, each of which is designed to drive an electromechanical pilot valve, in particular a solenoid valve or a piezo valve. The two pilot valves are in turn designed to provide or to discharge a working fluid to or from the working chamber of the working valve in order to cause a movement of the valve member of the working valve and thus to influenced a conductance value for the working valve.

The working valve comprises a valve housing which is penetrated by a fluid channel extending between an inlet port and an outlet port and in which a valve seat and the valve member are accommodated, wherein the valve member is arranged to be movable relative to the valve seat. The valve seat is associated with a seal which is made of an elastic, in particular rubber-elastic, material and which, in cooperation with the valve member, ensures a sealing blocking of the fluid channel in a closed position of the working valve.

A supply pressure sensor is attached to the inlet port of the working valve, which supply pressure sensor can optionally be integrated in the working valve or can be assigned as a separate component to the working port. Similarly, a working pressure sensor is attached to the outlet port of the working valve, which can also be either integrated in the working valve or assigned as a separate component to the working port. Both the supply pressure sensor and the working pressure sensor are designed to provide an analog or digital sensor signal and are connected to the controller. Furthermore, a position sensor is assigned to the working valve, which can be designed in the manner of a displacement measuring system and which serves to detect the position of the valve member which is equivalent to the actual value for the stroke of the working valve of the working valve. The position sensor is also designed to provide an analog or digital sensor signal and is connected to the controller. It is further provided that the fluid consumer is provided with a sensor system which is designed to detect a movement state of the fluid consumer. The fluid consumer, which is connected to the outlet port of the working valve, may be designed as a pneumatic cylinder, as a pneumatic motor, as a pneumatic swivel drive or as a volume to be filled or evacuated with compressed air or inert gas. With the aid of the sensor system a speed of movement of a moving component of the fluid consumer may be determined. For example the sensor system may detect a linear speed of a working piston, a rotational speed of a rotor or of a swivel piston. The sensor signal of the sensor system is provided to the controller as an analog or digital sensor signal. In addition, at least if the fluid consumer is designed as a pneumatic cylinder or as a swivel drive, a position of the working piston or the swivel piston can be determined with the aid of the sensor system and transmitted as a sensor signal to the controller.

The set value for the stroke of the working valve, which is required for the execution of the method according to the invention can be determined either in the controller on the basis of incoming sensor signals, in particular sensor signals from the sensor system of the fluid consumer, or it can be transmitted to the controller by an external component such as a machine control system which is connected with the controller.

The actual value for the stroke of the working valve which is required for the execution of the method according to the invention is determined on the basis of the sensor signal of the position sensor.

As an example, it is provided that the set value for the stroke of the working valve and the actual value for the stroke of the working valve are processed in a closed-loop control algorithm, which runs in the controller. A difference between set value for the stroke of the working valve and the actual value for the stroke of the working valve is used for determining a provisional control signal. If this provisional control signal would be used for an activation of the working valve, the deviation value for the working valve would be ignored and thus the activation of the working valve may not be precise due to age-related and/or operating mode-related changes in the valve behaviour of the working valve. Accordingly, it is intended to connect or link this provisional control signal with a deviation value which is determined using a mathematical model or an algorithm in the controller based on sensor signals of the supply pressure sensor, the working pressure sensor, the position sensor and the sensor system. The use of such a mathematical model or algorithm results in a control signal which takes into account the deviation value for the working valve and which can thus be used for precise control of the working valve.

The task of the invention is solved according to a second aspect of the invention with a method for operating a fluid system which comprises a controller, a working valve which can be activated by the controller and which working valve comprises an inlet port to which a fluid outlet and an outlet pressure sensor are connected and which working valve comprises an outlet port to which a fluid consumer and a working pressure sensor are connected and to which a position sensor for detecting a valve position is assigned, the fluid consumer being assigned a sensor system for detecting a movement state, and the outlet pressure sensor, the working pressure sensor and the sensor system being connected to the controller, wherein the controller carries out the following steps: receiving or determining a set value for a stroke of the working valve, determining an actual value for the stroke of the working valve using a sensor signal from the position sensor, determining a deviation value for the working valve as a function of sensor signals from the outlet pressure sensor, the working pressure sensor, the position sensor and the sensor system, and performing processing of the set value for the stroke of the working valve, the actual value for the stroke of the working valve and the deviation value to achieve a control signal for driving the working valve, and providing the control signal to the working valve.

This method serves to vent the fluid consumer, therefore the working valve is connected with its inlet port to a fluid outlet or, if applicable, to a vacuum source.

An advantageous aspect of the method is that during the operation of the fluid system, a continuous adaptation of the control signal for controlling the working valve is carried out without the need for interference in the fluid system with test pulses or learning runs. If necessary, it may be planned to carry out a learning run for the working valve during commissioning of the fluid system in order to ensure a particularly advantageous adaptation of the procedure to the real conditions in the fluid system.

Advantageous further embodiments of the invention are the subject of the subclaims.

It is useful if the controller for determining the deviation value executes a comparison between an actual pressure value determined from the sensor signal of the working pressure sensor and a model pressure value calculated on the basis of a mathematical model. The actual pressure value is available as the sensor signal of the working pressure sensor. The mathematical model, which is stored in an algorithm running in the control unit, maps the properties of the working valve and the fluid consumer connected to the working valve and enables a model pressure value to be calculated.

It is therefore preferably provided that the controller determines the deviation value as a function of at least one characteristic value of the fluid consumer, which is designed as a pneumatic cylinder and connected to the working valve via a hose, from the group: cylinder volume, dead volume, hose properties. In the case of the hose properties, the diameter of the hose, the elasticity of the hose and the length of the hose are of particular interest in order to ensure that the mathematical model is as realistic as possible with regard to the model pressure value.

According to a further embodiment of the invention, it is intended that the control signal for controlling the working valve is used as input variable for the mathematical model and that a valve characteristic of the working valve and characteristic values of the fluid consumer are processed in the mathematical model.

It is advantageous if a linear shift of the valve characteristic curve of the working valve, which describes a relationship between a conductance and a valve stroke, is carried out with respect to the valve stroke on the basis of the mathematical model in order to determine the control signal as a function of an actual conductance. Due to ageing phenomena in the working valve, which may be related with plastic deformation of rubber-elastic sealing elements, a change in the relationship between the valve stroke and the conductance, i.e. a cross-section available for the flow of fluid through the valve, may occur. For example, a sealing element attached to a movable valve member of the working valve may experience a reduction in volume due to prolonged stress. This can result in the working valve opening at a lower valve lift or smaller valve stroke after a certain period of use than is the case when the working valve is new. This change in the valve properties can be described by a linear shift of the valve characteristic along the characteristic axis that represents the valve stroke. In the mathematical model, the control signal is adjusted in this respect in order to adapt the actual conductance to the setpoint conductance with the smallest possible error.

In the case of a further embodiment of the method, it is intended that at a transition between a venting process and a bleeding process or at a transition between a bleeding process and a venting process, the mathematical model is reset and the mathematical model is restarted taking into account the actual pressure value of the working pressure sensor. This ensures that the mathematical model can always be re-calibrated with the current values of the sensor signals during such a transition and thus error propagation can be avoided.

It is preferable that the determination of the deviation value for the working valve is carried out cyclically recurring during the control of the working valve. Preferably, the deviation value is determined in the digitally operating controller with the same clock frequency as the working valve is activated, so that with each activation process for the working valve, a correction for the control signal is also made possible, thus ensuring the lowest possible error-free valve activation at any time during the activation of the working valve.

It is advantageous if a higher-level machine control system, which is connected to the controller, provides the set value for the stroke of the working valve for reception by the controller or if a higher-level machine control system, which is connected to the controller, provides a setpoint conductance value for reception and processing into the set value for the stroke of the working valve by the controller or that the set value for the stroke of the working valve is determined in the controller from a sensor signal of the sensor system.

The task of the invention is solved according to a third aspect by a fluid system for operating a fluid consumer. Here the fluid system comprises a controller and a working valve which can be activated by the controller, which comprises an inlet port to which a fluid source and a supply pressure sensor are connected and which comprises an outlet port to which a fluid consumer and a working pressure sensor are connected and to which a position sensor for detecting a valve position is assigned, wherein a sensor system for detecting a state of movement is assigned to the fluid consumer and wherein the supply pressure sensor, the working pressure sensor and the sensor system are connected to the controller, wherein the controller is designed to provide a control signal for actuating the working valve as a function of a setpoint conductance and of an actual conductance which can be determined using a sensor signal of the position sensor, wherein the controller is designed to correct the control signal as a function of a deviation value for the working valve which can be determined from sensor signals of the supply pressure sensor, the working pressure sensor, the position sensor and the sensor system.

In the case of an advantageous further embodiment of the fluid system, it is provided that the controller is designed for carrying out the method according to the first or second aspect of the invention.

The task of the invention is solved according to a fourth aspect of the invention with a computer program product for use in a computer device. Here the computer program product comprises instructions which, when executed in a controller of a fluid system, carry out the method according to the first or second aspect of the invention.

BRIEF DESCRIPTION OF THE DRAWINGS

An advantageous embodiment of the invention is shown in the drawing. Here shows.

DETAILED DESCRIPTION

Figure 1:
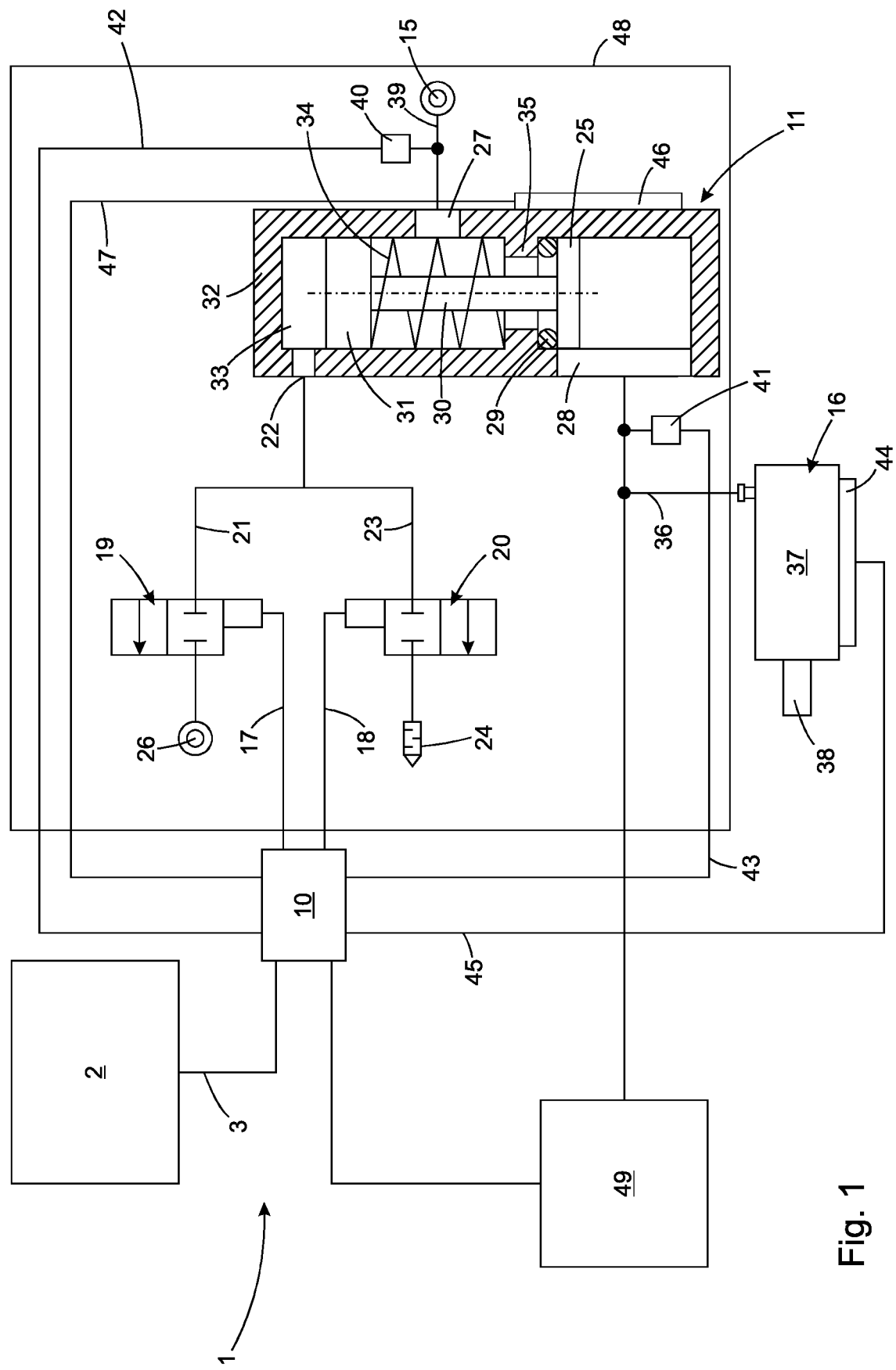
FIG. 1 a strictly schematic representation of a fluid system.

The fluid system 1 shown in FIG. 1 is designed to provide a linear actuating movement and can be used in a machine tool that is not shown in detail e.g. to temporarily fix and then release a workpiece that is also not shown in detail.

The fluid system 1 comprises a controller 10, which is designed to activate a working valve 11, the working valve 11 being provided for influencing a fluid flow between a fluid source 15, which is designed as a compressed air source, and a fluid consumer 16, which is designed as a pneumatic cylinder.

For the sake of clarity, only an air venting branch 48 for the fluid consumer 16 is shown in detail in the illustration in FIG. 1, while an air venting branch 49, which is in principle identically constructed, is only schematically shown, and is connected to the controller 10 in the same way as the air venting branch 48, but with a fluid outlet not shown and a silencer preferably attached to it instead of the fluid source 15.

According to FIG. 1 the controller 10 is not designed for a direct control of the working valve 11. This may be the case if the working valve 11 is designed as a solenoid valve.

According to FIG. 1 the control unit 10 provides electrical control signals to pilot valves 19, 20 via assigned control lines 17, 18. The pilot valves 19, 20 are designed as 2/2-way valves, in particular as piezo valves, and can be adjusted between a closed position and an open position proportionally depending on the control signal provided via the assigned control lines 17, 18. It is provided that the pilot valve 19 is connected on the inlet side to a compressed air source 26 and on the outlet side via a fluid line 21 to a control port 22 of the working valve 11.

It is also provided that the pilot valve 20 is connected on the inlet side via a fluid line 23 to the control port 22 and on the outlet side to a silencer 24, which forms a fluid outlet.

The working valve 11 is exemplarily designed as a fluidically pilot-controlled 2/2-way valve, in which a valve member 25 can block or release a fluid path between an inlet port 27 and an outlet port 28. In a blocking position, as shown in FIG. 1, the valve member 25 lies sealingly against a valve seat, which is formed by a circumferentially arranged sealing ring 29. When the valve member 25 is moved in a downward opening direction as shown in FIG. 1, the sealing effect between the valve member 25 and the sealing ring 29 is broken, allowing fluid to flow from the inlet port 27, which is connected to the fluid source 15, to the outlet port 28. To cause this opening movement for valve member 25, valve member 25 is connected to a working piston 31 via a coupling rod 30. Together with a section of a valve body 32 of the working valve 11, the working piston 31 defines a variable-size working chamber 33, which is connected to the control port 22. A first end section of a return spring 34 is supported on an end face of the working piston 31 facing away from the working chamber 33, the second end section of which rests on a ring collar 35 of the valve housing 32. The return spring 34 is compressed when pressure is applied to the working chamber 33 which results in an opening movement of the valve member 25. The return spring 34 causes a return movement for the working piston 31 and the valve member 25 connected thereto when the pressure in the working chamber 33 is subsequently reduced in order to restore the closed position for the working valve 11. As an example, it is intended that the sealing ring 29 rests against an end face of the ring collar 35 opposite the return spring 34.

The fluid consumer 16 is connected via a supply line 36 to the outlet port 28 of the working valve 11 and is designed to provide a linear working movement of a piston rod 38 movably accommodated in a cylinder housing 37.

Also connected to the supply line 36 is the venting branch 49, which has an identical internal structure as the venting branch 48 and which differs from the venting branch 48 only in that the not shown inlet port of the not shown working valve is connected to a fluid outlet, so that the venting branch 49 can be used for venting the fluid consumer 16.

Both the inlet port 27 and the outlet port 28 are each assigned a pressure sensor 40, 41, whereby sensor signals of the pressure sensors 40, 41 are provided to the controller 10 via assigned sensor lines 42, 43. Here, the pressure sensor 40 serves as a supply pressure sensor, while the pressure sensor 41 serves as a working pressure sensor. In the case of the venting branch 49, the pressure sensor arranged in the same way as the pressure sensor 40 on the working valve not shown and also not shown is referred to as the outlet pressure sensor.

Furthermore, it is provided that a displacement measuring system 44, which is also called the "sensor system", is attached to the fluid consumer 16, which is designed to determine a position of the piston rod 38 and which is connected to the controller 10 via a sensor line 45.

It is provided that the controller 10 is connected via a bus communication line 3 to a machine controller 2, which is designed to provide control commands to the controller 10.

A mode of operation of the fluid system 1 with regard to the provision of a fluid flow to the fluid consumer 16 can be described as follows: when a control command arrives which is provided by the machine controller 2 to the controller 10, this control command is converted in the controller 10 into a control signals for each of the pilot valves 19, 20. When one of the pilot control valves 19, 20 is actuated, either a pressure increase or a pressure reduction takes place in the working chamber 33 of the working valve 11, resulting in a change of position of the working piston 31 and the valve member 25 coupled thereto. Herewith a cross-section of the fluid path between the inlet port 27 and the outlet port 28 is changed. This results in a change in a mass flow rate for the working fluid provided by the fluid source 15, which is fed via the supply line 39 via the working valve 11 and the supply line 36 to the fluid consumer 16.

Figure 2:
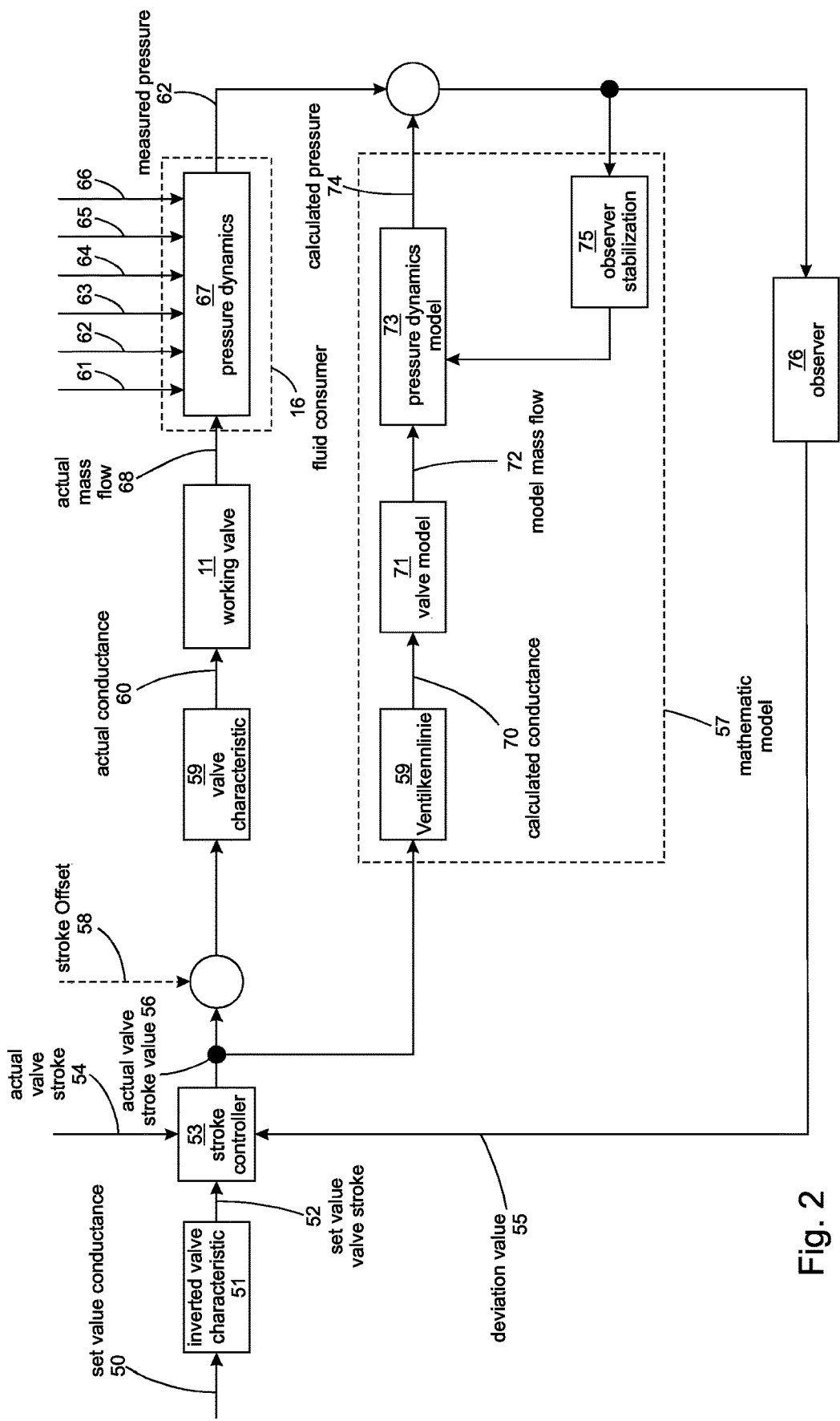
FIG. 2 a strictly schematic representation of a function for compensation of a time-varying valve behaviour, and FIG. 3 a purely schematic representation of an initial valve characteristic curve and a current valve characteristic curve.

In order to ensure that the working valve 11 is controlled as precisely as possible, an algorithm, which is shown schematically in FIG. 2, runs in the controller 10 as a part of a controller software. The algorithm comprises a mathematical model that represents the properties of the working valve 11 and the fluid consumer 16 and is used together with the sensor signals of the supply pressure sensor 40, the working pressure sensor 41, of the displacement encoder 44 and a position sensor 46 assigned to the working valve 11 for determining the position of the valve member 25. The result as calculated by the algorithm is provided to a disturbance variable observer described in more detail below, which determines the deviation value for the working valve 11 and makes it available for a combination with a set value for the stroke of the working valve 11 and an actual value for the stroke of the working valve 11 in order to generate a new control signal for the working valve 11 from it.

Figure 3:
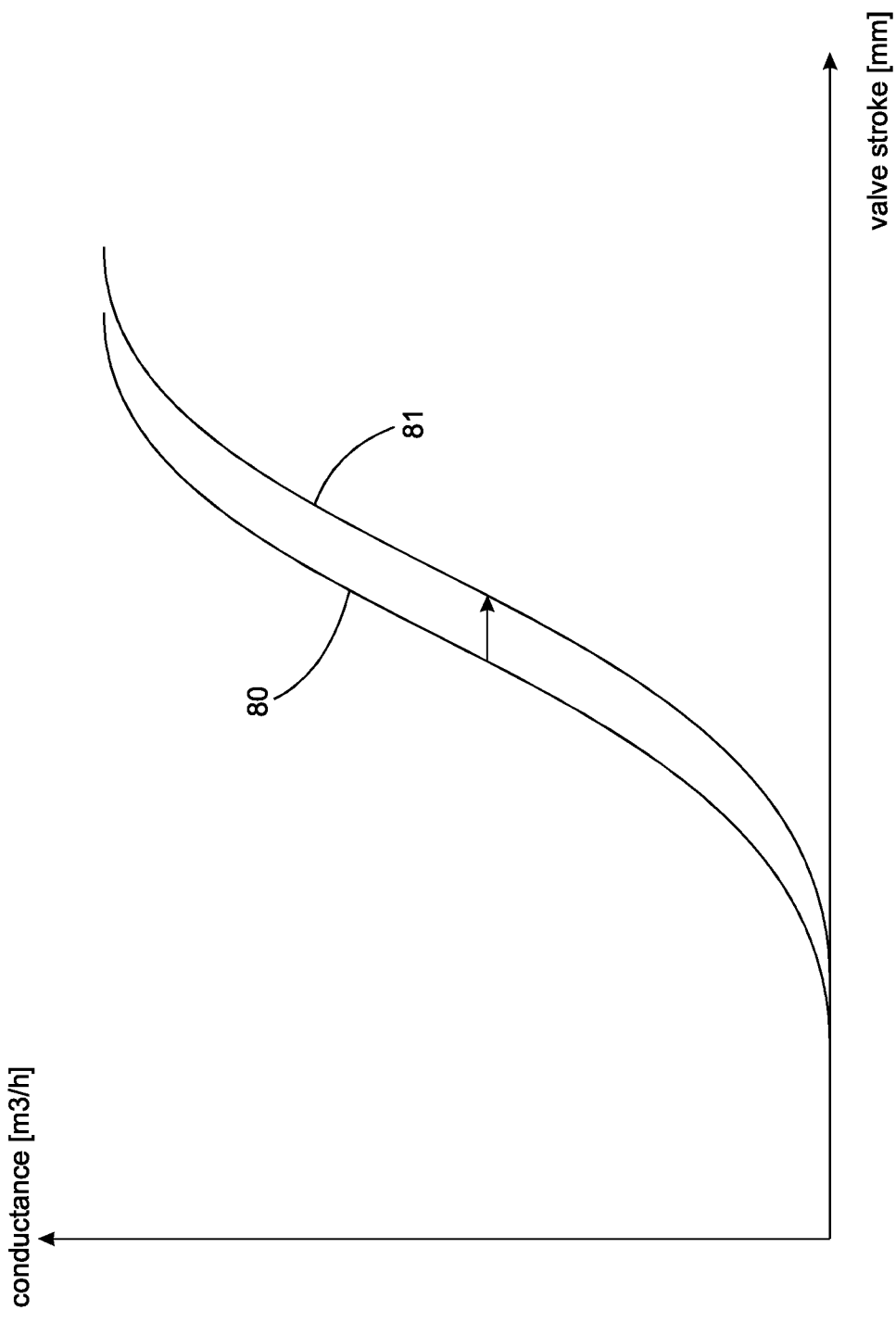

This new control signal can be symbolized by a linear displacement of the original valve characteristic 80, which is the basis for working valve 11 and which is determined when the working valve 11 is new, as shown in FIG. 3. The amount of displacement by which the original valve characteristic 80 must be shifted in order to arrive at the real valve characteristic 81 is determined using the method described below. The displacement can be caused, for example, by ageing phenomena on rubber-elastic sealing elements in working valve 11 and can lead to a positive or negative characteristic curve displacement, depending on the valve design.

To carry out the procedure, it is assumed that a setpoint conductance 50 shown in FIG. 2 is provided to the controller 10 shown in FIG. 1 from a machine control 2 shown in FIG. 1. Alternatively, the setpoint conductance 50 can also be calculated in the controller 10. The setpoint conductance 50 corresponds to an opening cross-section of working valve 11 required for the fluid supply of the fluid consumer 16, which is also referred to as the hole size of working valve 11. The setpoint conductance 50 is related to an inverted valve characteristic curve 51 in the controller 10 as shown in FIG. 2, in order to obtain a set value for the stroke of the working valve 52 in this way.

The set value for the stroke of the working valve 52 is fed to a stroke controller 53 running in the controller 10, which stroke controller 53 may be part of an independent software application. In the stroke controller 53, the set value for the stroke of the working valve 52 is processed with an actual value for the stroke of the working valve 54, which is determined from a sensor signal of a position sensor 46, and a deviation value 55 to an actual stroke value 56.

The actual valve travel value 56 is used by the travel controller 53 as a control signal for the working valve 11, in particular as a control signal for one of the pilot valves 19. In the illustration in FIG. 2, a stroke offset 58 occurring in practice due to the sealing properties of the sealing ring 29 which change over time and/or as a function of the operating conditions for the working valve 11 is symbolized by the dotted arrow as an influencing variable to be taken into account for the conversion of the actual stroke value 56 into the actual valve opening of the working valve 11, without this being an input variable which is explicitly fed to the actual stroke value 56. Rather, the travel offset 58 occurs in practice inherently as a disturbance variable and leads to undesired deviations between the actual travel value 56 specified by the travel controller 53 and the resulting real conductance value 60 of the working valve 11 due to the provision of the actual travel value 56 (in combination with the travel offset 58).

The actual travel value 56 provided by the travel controller 53 to the working valve 11 is converted there by the characteristics of the working valve 11, which is represented as valve characteristic 59, i.e. as the relationship between the actual travel value 56 and the resulting conductance, into the real conductance 60 and thus in an opening cross-section of the working valve 11 (hole size). The real conductance 60 is converted by the working valve 11 into an actual mass flow 68, which leads to a pressure dynamic 67 at the fluid consumer 16. The pressure dynamics 67 is one of the input variables symbolized by arrows and, for reasons of clarity, only marked with the reference symbol in each case:

Inlet pressure 61 (sensor signal of pressure sensor 40)
Outlet pressure 62 (sensor signal of pressure sensor 41)
presettable cylinder volume 63 of the fluid consumer 16 presettable dead volume 64 of the fluid consumer 16 presettable hose characteristics 65 of the fluid line 21 between the working valve 11 and the fluid consumer 16 motion signal 66 (sensor signal of the displacement encoder 44) and a kinematics (not shown) for the fluid consumer 16, which determines its positioning movement. The pressure dynamics 67 of the fluid consumer 16 results, on the one hand, in an unrepresented positioning movement of the fluid consumer 16 and, on the other hand, in the outlet pressure 62, which can be measured at the outlet port 28 of the working valve 11.

The actual stroke value 56 (or actual value for the stroke of the working valve) also serves as an input signal for a mathematical model 57 in which a pressure 74 is determined by using an algorithm running in the controller 10, in particular as a component of an independent software application. For this purpose, the actual stroke value 56 is first related to the valve characteristic 59 in order to calculate a conductance 70. The calculated conductance 70 is then supplied to a valve model 71, where the calculated conductance 70 is converted into a model mass flow 72. This model mass flow 72 is provided to the pressure dynamics model 73, which is designed to calculate a pressure 74 from the model mass flow 72.

The calculated pressure 74 is then related to the measured pressure 62, in particular by subtraction, and the result of this operation is fed to an observer stabilization algorithm 75, which is fed back to the pressure dynamics model 73.

Furthermore, the result of the mathematical operation between the calculated pressure 74 and the measured pressure 62 is fed to a disturbance variable observer 76, which, for example, as an integrator, integrates the result of the current mathematical operation with results of previous operations between the calculated pressure 74 and the measured pressure 62 and is designed, for example, in such a way that a target value for the integration approaches zero. In order to achieve this target value, the disturbance variable observer 76 can determine, starting from the respective current result of the integration, a deviation value 55, which serves as an input variable for the stroke controller 53 and whose magnitude corresponds at least substantially to the magnitude of the stroke offset 58 and whose sign is in each case opposite to the sign of the stroke offset 58, in order thereby to enable the stroke offset 58 to be compensated as completely as possible. Since the disturbance variable observer 76 also includes the input values for the pressure dynamics 67 when determining the deviation value 55, the sensor signals of the supply pressure sensor 40, the working pressure sensor 41, the position sensor 46 and the displacement encoder 44 are taken into account.

What is claimed is:

1. A method for operating a fluid system which comprises a controller, a working valve which can be activated by the controller and which working valve comprises an inlet port to which a fluid source and a supply pressure sensor are connected and which working valve comprises an outlet port to which a fluid consumer and a working pressure sensor are connected, wherein a position sensor for detecting a valve position is assigned to the working valve, wherein the fluid consumer is assigned a sensor system for detecting a movement state and wherein the supply pressure sensor, the working pressure sensor and the sensor system are connected to the controller, wherein the controller performs the following steps:

receiving or determining a set value for a stroke of the working valve;

determining an actual value for the stroke of the working valve using a sensor signal of the position sensor;

determining a deviation value for the working valve as a function of sensor signals of the supply pressure sensor, the working pressure sensor, the position sensor and the sensor system; and performing a processing of the set value for the stroke of the working valve, the actual value for the stroke of the working valve and the deviation value to achieve a control signal for controlling the working valve and providing the control signal to the working valve.

2. A method for operating a fluid system which comprises a controller, a working valve which can be activated by the controller and which working valve comprises an inlet port to which a fluid outlet and an outlet pressure sensor are connected and which working valve comprises an outlet port to which a fluid consumer and a working pressure sensor are connected, wherein a position sensor for detecting a valve position is assigned to the working valve, the fluid consumer being assigned a sensor system for detecting a movement state, and the outlet pressure sensor, the working pressure sensor and the sensor system being connected to the controller, wherein the controller carries out the following steps:

receiving or determining a set value for a stroke of the working valve;

determining an actual value for the stroke of the working valve using a sensor signal from the position sensor;

determining a deviation value for the working valve as a function of sensor signals from the outlet pressure sensor, the working pressure sensor, the position sensor and the sensor system; and performing processing of the set value for the stroke of the working valve, the actual value for the stroke of the working valve and the deviation value to achieve a control signal for driving the working valve, and providing the control signal to the working valve.

3. The method according to claim 1, wherein the controller for determining the deviation value executes a comparison between an actual pressure value determined from the sensor signal of the working pressure sensor and a model pressure value calculated on the basis of a mathematical model.

4. The method according to claim 3, wherein the controller determines the deviation value as a function of at least one characteristic value of the fluid consumer, which is in the form of a pneumatic cylinder and is connected to the working valve via a hose, from the group: cylinder volume, dead volume, hose properties.

5. The method according to claim 4, wherein the control signal for activating the working valve is used as an input variable for the mathematical model and wherein, in the mathematical model, a valve characteristic of the working valve and characteristic values of the fluid consumer are processed.

6. The method according to claim 5, wherein a linear displacement of the valve characteristic curve of the working valve, which describes a relationship between a conductance and a stroke of the working valve, is carried out with respect to the stroke of the working valve by means of the mathematical model in order to determine the control signal as a function of an actual conductance.

7. The method according to claim 1, wherein, at a transition between a ventilating process and a venting process or at a transition between a venting process and a ventilating process, a resetting of a mathematical model which is used for a calculation of a model pressure value is performed and a restarting of the mathematical model is performed taking into account the actual pressure value of the working pressure sensor.

8. The method according to claim 1, wherein the determination of the deviation value for the working valve is carried out cyclically recurrently during an activation of the working valve.

9. The method according to claim 1, wherein a superordinate machine controller connected to the controller provides the set value for the stroke of the working valve for reception by the controller and processing into the set value for the stroke of the working valve by the controller.

10. The method according to claim 1, wherein a superordinate machine controller connected to the controller provides a setpoint conductance for reception and processing into the set value for the stroke of the working valve by the controller.

11. The method according to claim 1, wherein the determination of the set value for the stroke of the working valve in the controller is carried out based on a sensor signal of the sensor system.

12. A fluid system for operating a fluid consumer, having a controller and a working valve which can be activated by the controller, which working valve comprises an inlet port to which a fluid source and a supply pressure sensor or a fluid outlet and an outlet pressure sensor are connected and which comprises an outlet port, to which a fluid consumer and a working pressure sensor are connected and with which a position sensor for detecting a valve position is associated, wherein a sensor system for detecting a movement state is associated with the fluid consumer and wherein the supply pressure sensor is associated with the fluid consumer, the working pressure sensor or the outlet pressure sensor and the sensor system are connected to the controller, the controller being designed to provide a control signal for actuating the working valve as a function of a setpoint conductance and of an actual conductance which is determined using a sensor signal from the position sensor, wherein the controller is designed for a correction of the control signal in dependence on a deviation value for the working valve which is determined from sensor signals of the supply pressure sensor or the outlet pressure sensor, the working pressure sensor, the position sensor and the sensor system.

13. The fluid system according to claim 12, wherein the controller is designed to perform the following steps: receiving or determining a set value for a stroke of the working valve, determining an actual value for the stroke of the working valve using a sensor signal of the position sensor, determining a deviation value for the working valve as a function of sensor signals of the supply pressure sensor, the working pressure sensor, the position sensor and the sensor system and performing a processing of the set value for the stroke of the working valve, the actual value for the stroke of the working valve and the deviation value to a control signal for controlling the working valve and providing the control signal to the working valve.

14. The fluid system according to claim 12, wherein the controller is designed to perform the following steps: receiving or determining a set value for the stroke of the working valve, determining an actual value for the stroke of the working valve using a sensor signal from the position sensor, determining a deviation value for the working valve as a function of sensor signals from the outlet pressure sensor, the working pressure sensor, the position sensor and the sensor system, and performing processing of the set value for the stroke of the working valve, the actual value for the stroke of the working valve and the deviation value to achieve a control signal for driving the working valve, and providing the control signal to the working valve.

15. The method according to claim 2, wherein the controller for determining the deviation value executes a comparison between an actual pressure value determined from the sensor signal of the working pressure sensor and a model pressure value calculated on the basis of a mathematical model.

16. The method according to claim 2, wherein, at a transition between a ventilating process and a venting process or at a transition between a venting process and a ventilating process, a resetting of a mathematical model which is used for a calculation of a model pressure value is performed and a restarting of the mathematical model is performed taking into account the actual pressure value of the working pressure sensor.

17. The method according to claim 2, wherein the determination of the deviation value for the working valve is carried out cyclically recurrently during an activation of the working valve.

18. The method according to claim 2, wherein a superordinate machine controller connected to the controller provides the set value for the stroke of the working valve for reception by the controller and processing into the set value for the stroke of the working valve by the controller.

* * * * *